US012011948B2

(12) United States Patent
Zhang

(10) Patent No.: US 12,011,948 B2
(45) Date of Patent: Jun. 18, 2024

(54) DOUBLE-HEAD MARKER PEN

(71) Applicant: CHINA FIRST PENCIL CO., LTD., Shanghai (CN)

(72) Inventor: Bingyang Zhang, Shanghai (CN)

(73) Assignee: CHINA FIRST PENCIL CO., LTD., Shanghai (CN)

( * ) Notice: Subject to any disclaimer, the term of this patent is extended or adjusted under 35 U.S.C. 154(b) by 0 days.

(21) Appl. No.: 18/200,031

(22) Filed: May 22, 2023

(65) Prior Publication Data

US 2023/0373237 A1 Nov. 23, 2023

(30) Foreign Application Priority Data

May 23, 2022 (CN) ......................... 202221359473.7

(51) Int. Cl.

*B43K 27/00* (2006.01)
*B43K 8/03* (2006.01)
*B43K 8/12* (2006.01)
*B43K 11/00* (2006.01)

(52) U.S. Cl.

CPC .............. *B43K 27/006* (2013.01); *B43K 8/03* (2013.01); *B43K 8/12* (2013.01); *B43K 11/005* (2013.01)

(58) Field of Classification Search

CPC .......... B43K 27/006; B43K 8/03; B43K 8/12; B43K 27/00; B43K 27/003; B43K 27/02; B43K 27/08; B43K 27/12; B43K 11/00; B43K 11/005
USPC ............................................... 401/16, 18, 34
See application file for complete search history.

(56) References Cited

U.S. PATENT DOCUMENTS

2006/0062630 A1* 3/2006 Yeh ........................ B43K 27/00 401/23
2006/0165470 A1* 7/2006 Gerules .................. B43K 27/02 401/17
2014/0369732 A1* 12/2014 Chen ...................... G09B 11/02 401/6

FOREIGN PATENT DOCUMENTS

JP S4875725 U 9/1973
JP S4984135 U 7/1974
JP 2002036786 A 2/2002
JP 2019202433 A 11/2019

OTHER PUBLICATIONS

European Search Report of Corresponding Application EP23174580, Oct. 24, 2023; 4 pages.
European Communication in Corresponding Application EP23174580; Nov. 8, 2023; 5 pages.

* cited by examiner

*Primary Examiner* — David J Walczak
(74) *Attorney, Agent, or Firm* — Cooper Legal Group, LLC

(57) ABSTRACT

A double-head marker pen includes a first penholder, a second penholder and a connecting tube; one end of the first penholder is formed with a first pen head, and one end of the second penholder is formed with a second pen head; and an end of the first penholder away from the first pen head is detachably connected with an end of the second penholder away from the second pen head by the connecting tube.

13 Claims, 4 Drawing Sheets

DOUBLE-HEAD MARKER PEN

CROSS-REFERENCE TO RELATED APPLICATION

This application claims the priority and benefit of Chinese patent application serial no. 202221359473.7, filed on May 23, 2022. The entirety of Chinese patent application serial no. 202221359473.7 is hereby incorporated by reference herein and made a part of this specification.

TECHNICAL FIELD

The present application relates to a field of marker pen production technology, and, in particular, relates to a double-head marker pen.

BACKGROUND ART

A marker pen, as the commonly used learning office supply, is usually used to quickly express a design idea and draw a design rendering.

At present, the marker pens are mainly divided into a single headed marker pen and a double-head marker pen. In particular, the double-head marker pen usually includes a penholder and two pen heads formed at both ends of the penholder. Inner tubes of the two pen heads are respectively mounted with a pointed pen tip and a flat pen tip. An inner cavity of the penholder located between the two pen heads is provided with a pigment solvent storage cotton core, and pigment solvent suction rods of the pointed pen tip and the flat pen tip are inserted into the pigment solvent storage cotton core respectively from two pen head ends. When in use, the pigment solvent suction rods of the pointed pen tip and the flat pen tip respectively suck the pigment solvent in both ends of the pigment solvent storage cotton core, and deliver the pigment solvent to an end of the corresponding pointed pen tip or flat pen tip extending out of the pen head, thus writing and painting functions of the pen tip are achieved.

In view of the above related technologies, due to a volatility of the pigment solvent in the marker pen, for the traditional double-head marker pen, the pigment solvent storage cotton core is usually sealed inside the penholder and is non-detachable; and additionally, when a user frequently uses one of the pen tips, the pigment solvent in the corresponding end of the pigment solvent storage cotton core will be used up faster. Therefore, after the pigment solvent in one end of the pigment solvent storage cotton core is used up, a user has to use another marker pen instead, with the usable pen tip at the other end being discarded, so that the use cost of the marker pen is higher, and there is a room for improvement.

SUMMARY

In order to reduce the use cost of the double-head marker pen, the present application provides the double-head marker pen.

The double-head marker pen provided in the present application adopts the following technical solutions.

The double-head marker pen includes a first penholder, a second penholder and a connecting tube; one end of the first penholder is formed with a first pen head, and one end of the second penholder is formed with a second pen head; and an end of the first penholder away from the first pen head is detachably connected with an end of the second penholder away from the second pen head by the connecting tube.

In the above technical solutions, when in use, the pointed pen tip and the flat pen tip are respectively mounted in the inner tube of the first pen head and the inner tube of the second pen head. The end of the first penholder away from the first pen head and the end of the second penholder away from the second pen head are respectively connected to both ends of the connecting tube, thus the double-head marker pen are assembled. After the pigment solvents in the first penholder or the second penholder are exhausted, the user removes the first penholder or the second penholder where the pigment solvents are exhausted from the connecting tube, and the new first penholder or the new second penholder are mounted. Thus, the unused pen tip can be used normally, and the normal use function of the double-head marker pen can be restored, so that the operations of replacing the double-head marker pen and discarding the unused pen tip are replaced, and further the utilization rate of each pen tip of the marker pen is effectively ensured and the use cost of the marker pen is effectively reduced.

In some embodiments, the end of the first penholder away from the first pen head and the end of the second penholder away from the second pen head are inserted into the connecting tube from both ends of the connecting tube, respectively, and are slidably connected with an inner wall of the connecting tube along a length direction of the connecting tube; and the first penholder is in close fit connection with the connecting tube, and the second penholder is in close fit connection with the connecting tube.

In the above technical solutions, by utilizing the slidable connection between the first penholder and the inner wall of the connecting tube, as well as the slidable connection between the second penholder and the inner wall of the connecting tube, the detachable connection of the first penholder and the second penholder are achieved. The connection structure is simple, so that it is easy for the user to disassemble and assemble and helps to improve the convenience when using the double-head marker pen.

In some embodiments, an end of the first penholder close to the first pen head is formed with a first stopper ring, and an end of the second penholder close to the second pen head is formed with a second stopper ring.

In the above technical solutions, the first stopper ring and second stopper ring are respectively configured to limit the length of the first penholder and the second penholder inserted into the connecting tube, so as to reduce the occurrence of sliding of the first penholder or second penholder relative to the inner wall of the connecting tube when the user uses the double-head marker pen, thereby improving the stability of the structure of the double-head marker pen and ensuring the normal use of the double-head marker by the user.

In some embodiments, a cross section of the first penholder along a direction vertical to a length direction of the first penholder, a cross section of the second penholder along a direction vertical to a length direction of the second penholder, and a cross section of the connecting tube along a direction vertical to a length direction of the connecting tube of water-drop shape.

In the above technical solutions, the cross sections of the first penholder, the second penholder and the connecting tube along the directions vertical to their own length directions are of water-drop shape, so that the shapes of the first penholder and the second penholder conform to the holding posture of the human, and thus it is convenient for the user to hold the corresponding first penholder, the second penholder and the connecting tube, and the comfort of the user when holding the double-head marker pen is effectively improved.

In some embodiments, one end of the first penholder formed with the first pen head is provided with a first pen cap, and the second penholder formed with the second pen head is provided with a second pen cap; and the first pen cap abuts against the first stopper ring, and the second pen cap abuts against the second stopper ring.

In the above technical solutions, the pointed pen tip and the flat pen tip are covered by using the first pen cap and the second pen cap respectively, one the one hand, it helps to reduce the pollution f the external environment on the corresponding pen tip; on the other hand, the first pen cap and the second pen cap are configured to seal the spare pointed pen tip and the spare flat pen tip respectively, so as to reduce the evaporation of pigment solvents from the part of the pointed pen tip extending out of the first head and the part of the flat pen tip extending out of the second pen head.

In some embodiments, a part of the first stopper ring corresponding to an outer circular surface of the connecting tube protrudes from an outer circular surface of the first pen cap and the outer circular surface of the connecting tube, and forms a first edge; and a part of the second stopper ring corresponding to the outer circular surface of the connecting tube protrudes from an outer circular surface of the second pen cap and the outer circular surface of the connecting tube, and forms a second edge.

In the above technical solutions, when in use, the user presses the first edge or the second edge with one hand, and pulls the connecting tube with the other hand, so as to separate the first penholder or the second penholder from the connecting tube; the user press the first edge or the second edge with one hand, and pulls the first pen cap or the second pen cap with the other hand, so as to separate the first pen cap or the second pen cap from the corresponding first penholder or the second penholder. The first edge and the second edge are provided, which facilitates the users to separate the corresponding first penholder and the second penholder from the connecting tube, as well as the corresponding first pen cap and the second pen cap from the connecting tube, thereby the convenience when the user uses the double-head marker pen is further improved.

In some embodiments, the end of the first penholder away from the first pen head is defined with a first cotton core insertion port, which is in communication with an inner cavity of the first penholder; the end of the second penholder away from the second pen head is defined with a second cotton core insertion port in communication with an inner cavity of the second penholder; and the first cotton core insertion port and the second cotton core insertion port are detachably provided with a closure, respectively.

In the above technical solutions, after the pigment solvents in the inner cavity of the first penholder or the second penholder are exhausted, the user removes the closure in the corresponding first cotton core insertion port or the corresponding second cotton core insertion port, then removes the corresponding pigment solvent storage cotton core from the inner cavity of the first penholder or the second penholder, and replaces with the new pigment solvent storage cotton core. Optionally, the pigment solvents are directly added to the corresponding pigment solvent storage cotton core from the corresponding first cotton core insertion port or the second cotton core insertion port, so as to refill the corresponding pointed pen tip or the flat pen tip with the ink and restore the use function of the corresponding pen tip. Then, the closure is mounted again, so that the corresponding pointed pen tip or the flat pen tip can be reused, and the service life of the corresponding pen tip can be extended, thus the use cost of the double-head marker pen can be further reduced.

In some embodiments, a middle part of the closure is mounted with an elastic sealing part, and an ink injection port is defined in and runs through the elastic sealing part along the length direction of the first penholder or the length direction of the second penholder.

In the above technical solutions, after the pigment solvents in the inner cavity of the first penholder or the second penholder are exhausted, the user uses a syringe to suck the pigment solvents, removes the closure and inserts the syringe needle into the inner cavity of the corresponding first penholder or the second penholder from the ink injection port. Then, the user pushes the handle of the syringe, and the pigment solvents are injected into the pigment solvent storage cotton core in the inner cavity of the first penholder or the second penholder from the syringe needle. After injecting the ink, the syringe needle is removed from the elastic sealing part, and the ink injection port in the elastic sealing part automatically closes, so as to reduce the operation of manually sealing the ink injection port by the user. The ink injection operation steps are simplified effectively, and further the efficiency of ink injection operations is improved effectively, and the convenience when the user uses the double-head marker pen is ensured effectively.

In some embodiments, the ink injection port in the elastic sealing part is closed by an elastic force of the elastic sealing part during a non-ink injection period, and an inner diameter of the ink injection port is expandable when inserting an external object.

In some embodiments, the first penholder is in sealing cooperation with the connecting tube, and the second penholder is in sealing cooperation with the connecting tube are sealing connections.

In the above technical solutions, the sealing connections ensure that the entire internal space of the marker pen is sealed, and the air pressure remains unchanged. No matter how the pen is flipped or swung, the ink in the penholder will not leak out of the ink injection port. In combination with the sealing and anti leakage functions of the ink injection port itself, the double sealing and anti leakage functions are achieved.

In some embodiments, an outer circumferential surface of the first penholder and an outer circumferential surface of the second penholder are composed of a first inclined plane, a second inclined plane and an arc-shaped surface; an angle between the first inclined plane and the second inclined plane is an acute angle, and two sides of the arc-shaped surface are respectively connected to the first inclined plane and the second inclined plane transitively via an arc surface; and a shape of an inner circumferential wall of the connecting tube is matched with a shape of an outer circumferential wall of the first penholder and a shape of an outer circumferential wall of the second penholder.

In the above technical solutions, the first penholder and second penholder will not rotate relative to the connecting tube in the circumferential direction, so as to avoid the damage to the sealing among them caused by the relative rotation among the first penholder, the second penholder and the connecting tube.

In summary, the present application has at least one of the following beneficial technical effects:

1. by using the connecting tube, the first penholder and the second penholder are detachable, so as to achieve the relative independence of the first pen head and the second pen head of the double-head marker pen; after the pigment solvents in the first penholder or the second penholder are exhausted, the penholder where the pigment solvents are exhausted is removed from the connecting tube, and replaced with the new first penholder or the new second penholder, thus the unused first penholder or the unused second penholder can be used normally, so that the operations of replacing the double-head marker pen and discarding the unused pen tip are replaced, and further the utilization rate of each pen tip of the marker pen is effectively ensured and the use cost of the marker pen is effectively reduced; and at the same time, it contributes to resource recycling, and energy conservation and environmental protection.

2. by utilizing the slidable connection between the first penholder and the connecting tube, as well as the slidable connection between the second penholder and the connecting tube, the detachable connection of the first penholder and the second penholder are achieved; and the connection structure is simple, so that it helps to improve the convenience when using the double-head marker pen.
3. the cross sections of the first penholder, the second penholder and the connecting tube along the directions vertical to their own length directions are water-droplet-shaped, so that the comfort of the user when holding the double-head marker pen is effectively improved, and the convenience when using the double-head marker pen is further improved.

DETAILED DESCRIPTION

The present application is further described in detail below in combination with FIGS. 1-4.

The embodiments of the present application disclose a double-head marker pen.

Figure 1:
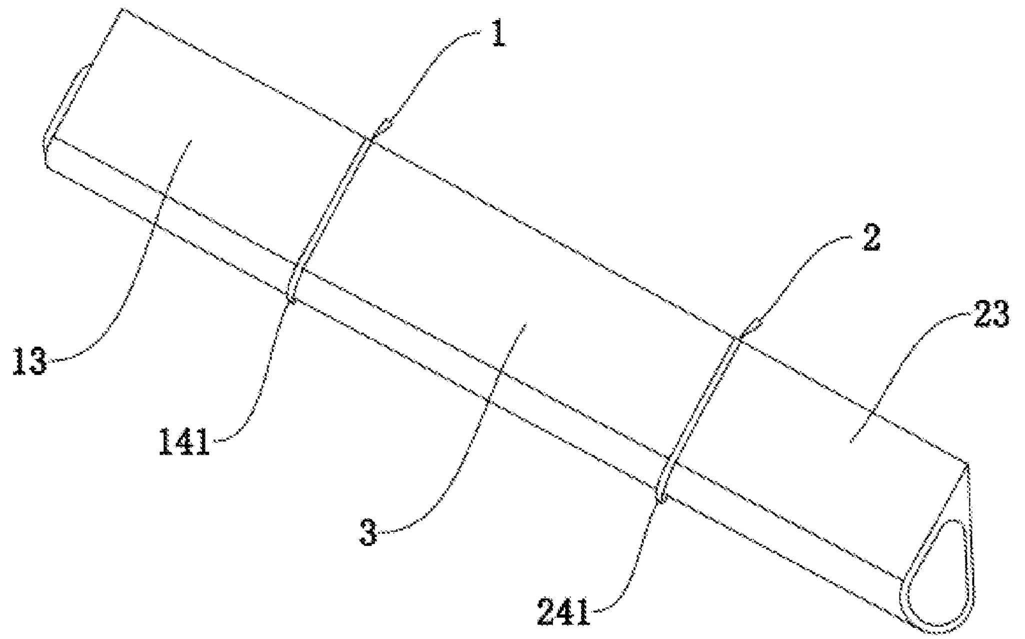
FIG. 1 is an axonometric diagram mainly illustrating an overall structure of a double-head marker pen in an embodiment of the present application.
Figure 2:
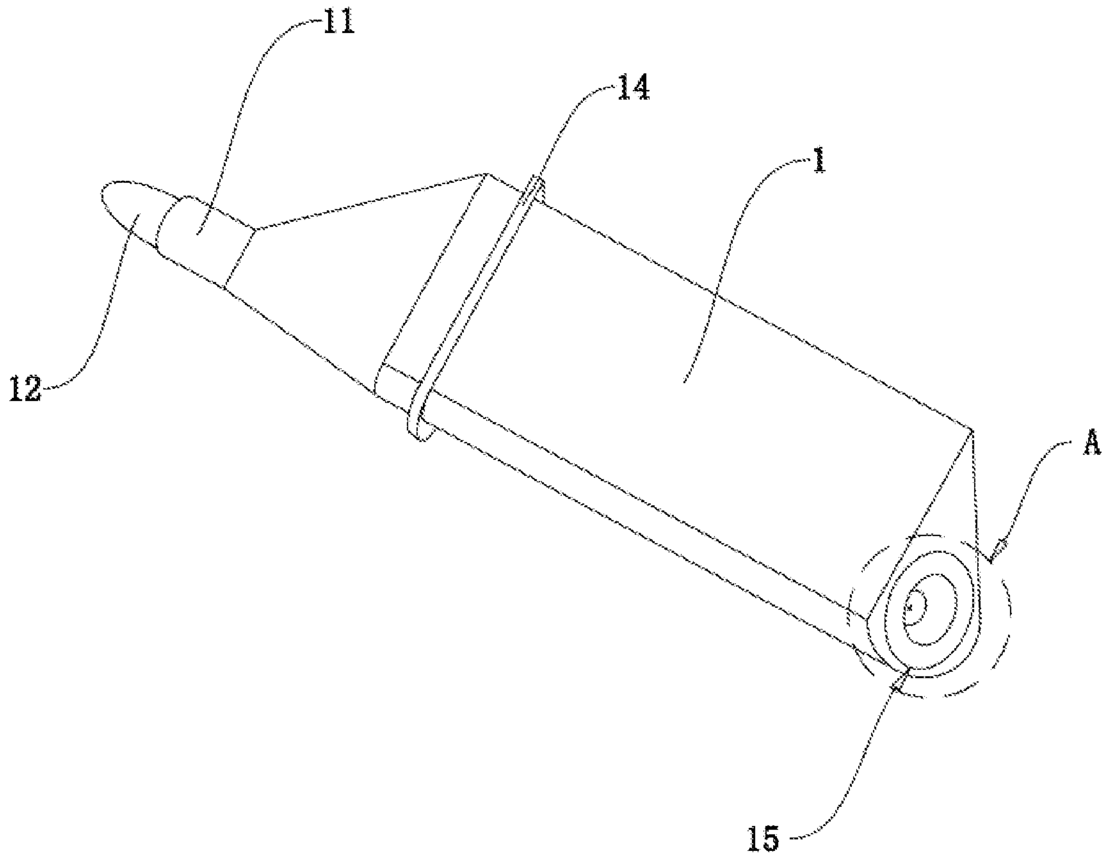
FIG. 2 is an axonometric diagram mainly illustrating an overall structure of a first penholder in an embodiment of the present application.
Figure 3:
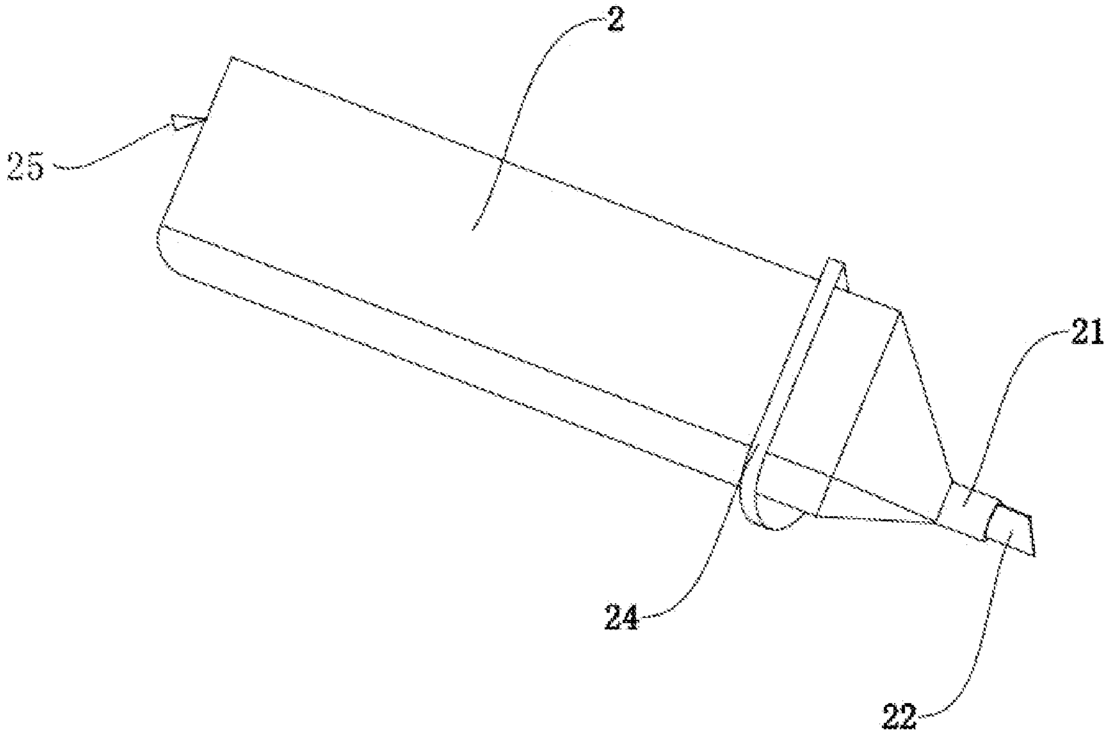
FIG. 3 is an axonometric diagram mainly illustrating an overall structure of a second penholder in an embodiment of the present application.
Figure 4:
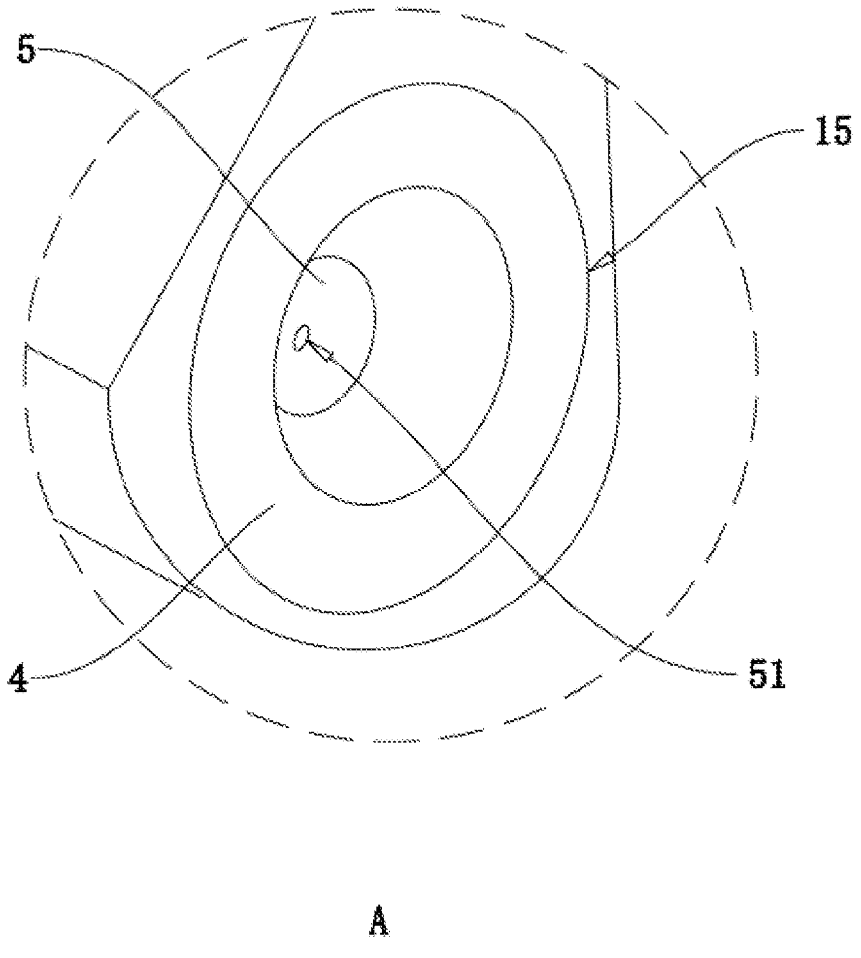
FIG. 4 is an enlarged view of Part A in FIG. 2, mainly illustrating mounting position of a closure.

Referring to FIG. 1 and FIG. 2, the double-head marker pen includes a first penholder 1 and a first pen head 11 formed at one end of the first penholder 1, and an axial direction of an inner tube of the first pen head 11 is parallel to a length direction of the first penholder 1. Referring to FIG. 1 and FIG. 3, an end of the first penholder 1 away from the first pen head 11 is provided with a second penholder 2, one end of the second penholder 2 is integrally formed with a second pen head 21, and an axial direction of an inner tube of the second pen head 21 is parallel to a length direction of the second penholder 2. A connecting tube 3 is detachably provided between the first penholder 1 and the second penholder 2, and length directions of the first penholder 1, the second penholder 2 and the connecting tube 3 are collinear with each other.

The radial longitudinal sections of the first penholder 1 and the second penholder 2 can be of water-drop, circular or elliptical shape.

Specifically, referring to FIG. 2 and FIG. 3, an inner tube of the first pen head 11 is coaxially mounted with a pointed pen tip 12, and an inner tube of the second pen head 21 is coaxially mounted with a flat pen tip 22. Further, referring to FIG. 1, an end of the first penholder 1 mounted with the pointed pen tip 12 is provided with a matching first pen cap 13, and an end of the second penholder 2 mounted with the flat pen tip 22 is adaptively provided with a matching second pen cap 23. When in use, the first pen cap 13 and the second pen cap 23 respectively cover the pointed pen tip 12 and the flat pen tip 22, so as to reduce a pollution of the external environment on the pointed pen tip 12 and the flat pen tip 22. Meanwhile, the first pen cap 13 and the second pen cap 23 respectively seal an end of the pointed pen tip 12 extending out of the first pen head 11 and a part of the flat pen tip 22 extending out of the second pen head 21, so as to reduce an evaporation of pigment solvents from a part of the pointed pen tip 12 extending out of the first pen head 11 and the end of the flat pen tip 22 extending out of the second pen head 21, thus prolonging a service life of the corresponding pointed pen tip 12 or flat pen tip 22.

Moreover, referring to FIG. 2 and FIG. 3, an end of the first penholder 1 close to the first pen head 11 is provided with a first stopper ring 14 extending outwards along a radial direction of the first pen head 11, and an end of the second penholder 2 close to the second pen head 21 is provided with a second stopper ring 24 extending outwards along a radial direction of the second pen head 21. When in use, an end surface of an open end of the first pen cap 13 abuts against an end of the first stopper ring 14 close to the first pen head 11, and an end surface of an open end of the second pen cap 23 abuts against an end of the second stopper ring 24 close to the second pen head 21. The first stopper ring 14 is configured to limit a length of the first pen cap 13 covering the first penholder 1, so as to reduce an occurrence of the first pen cap 13 pressing and damaging the pointed pen tip 12; and similarly, the second stopper ring 24 is configured to reduce an occurrence of the second pen cap 23 pressing and damaging the flat pen tip 22.

Referring to FIG. 2, the end of the first penholder 1 away from the first pen head 11 is defined with a first cotton core insertion port 15, which is in communication with an inner cavity of the first penholder 1. Similarly, the end of the second penholder 2 away from the second pen head 21 is defined with a second cotton core insertion port 25, which is in communication with an inner cavity of the second penholder 2. When in use, pigment solvent storage cotton cores in the inner cavity of the first penholder 1 and the inner cavity of the second penholder 2 are respectively inserted in and removed from the first cotton core insertion port 15 and the second cotton core insertion port 25, respectively. Meanwhile, referring to FIG. 4, the first cotton core insertion port and the second cotton core insertion port 25 are detachably provided with a closure 4 respectively. In this embodiment of the present application, each of the closures 4 is in close interference fit with an inner wall of the corresponding first cotton core insertion port 15 and the second cotton core insertion port 25. Additionally, an elastic sealing part 5 is installed in the middle of each of the closures 4 along the length direction of the first penholder 1, and an ink injection port 51 is defined in any of the elastic sealing parts 5 and penetrates therethrough along the length direction of the first penholder 1. In this embodiment, the elastic sealing part 5 is a rubber stopper.

After the pigment solvents in the inner cavity of the first penholder 1 or the second penholder 2 are exhausted, a user can use a syringe to suck the pigment solvents, open the elastic sealing part 5, and insert a syringe needle into an inner cavity of a corresponding first penholder 1 or the second penholder 2 from the ink injection port 51. Then, the user pushes a handle of the syringe, so as to inject the pigment solvents into the pigment solvent storage cotton core in the inner cavity of the first penholder 1 or the second penholder 2 from the syringe needle. After injecting the ink, the syringe needle is removed from the elastic sealing part 5, and the ink injection port 51 in the elastic sealing part 5 is automatically closed, finishing an ink replenishing operation for the corresponding pointed pen tip 12 or the flat pen tip 22.

Referring to FIG. 1, the end of the first penholder 1 away from the first pen head 11, and the end of the second penholder 2 away from the second pen head 21 are inserted into the connecting tube 3 respectively from both ends of the connecting tube 3. The first penholder 1 and the second penholder 2 are slidably connected with an inner wall of the connecting tube 3 along a length direction of the connecting tube 3. The first penholder 1 is in close fit connection with the connecting tube 3, and the second penholder 2 is in close fit connection with the connecting tube 3. The user can pull the first penholder 1 or the second penholder 2 to remove the corresponding first penholder 1 or the second penholder 2 from the connecting tube 3. After replenishing ink into the inner cavity of the first penholder 1 or the second penholder 2, the end of the corresponding first penholder 1 or the second penholder 2 away from the corresponding pen head is inserted into the connecting tube 3 from a corresponding opening of the connecting tube 3, thereby finishing a replacement of a new first penholder 1 or the second penholder 2.

Moreover, in order to adapt to a posture of a human holding the pen and improve a comfort of the user for holding the double-head marker pen, a cross section of the first penholder 1 along a direction vertical to the length direction of the first penholder 1, a cross section of the second penholder 2 along a direction vertical to the length direction of the second penholder 2, and a cross section of the connecting tube 3 along a direction vertical to a length direction of the connecting tube 3 are of water-drop shape.

Additionally, in order to improve a convenience of detaching or mounting the corresponding penholder, a portion of the first stopper ring 14 corresponding to an outer circular surface of the connecting tube 3 protrudes from an outer circular surface of the first pen cap 13 and the outer circular surface of the connecting tube 3, and forms a first edge 141; and a portion of the second stopper ring 24 corresponding to the outer circular surface of the connecting tube 3 protrudes from an outer circular surface of the second pen cap 23 and the outer circular surface of the connecting tube 3, and forms a second edge 241. When in use, the user can hold the first pen cap 13 or the second pen cap 23 with one hand while pressing the first edge 141 or the second edge 241, and pulls the connecting tube 3 with the other hand, so as to separate the first penholder 1 or the second penholder 2 from the connecting tube 3. Similarly, the user can hold the connecting tube 3 with one hand while pressing the first edge 141 or the second edge 241, and pulls the first pen cap 13 or the second pen cap 23 with the other hand, so as to separate the first pen cap 13 or the second pen cap 23 from the corresponding first penholder 1 or the second penholder 2.

An implementation principle of the double-head marker pen in the embodiments of the present application is as follows: in actual use, the user holds the connecting tube 3 with one hand while pressing the first edge 141 or the second edge 241 with fingers, and pulls the first pen cap 13 or the second pen cap 23 with the other hand, thus the first pen cap 13 or the second pen cap 23 is removed from the corresponding first penholder 1 or the second penholder 2. Thereby, the corresponding pointed pen tip 12 or flat pen tip 22 can be used for writing and drawing.

After the pigment solvents in the first penholder 1 or the second penholder 2 are exhausted, the user can pull the corresponding first penholder 1 or the second penholder 2 to remove the first penholder 1 or the second penholder 2 exhausted of the pigment solvents from the connecting tube 3. Then, the user can use the syringe to suck the pigment solvents and insert the syringe needle into the inner cavity of the corresponding first penholder 1 or the second penholder 2 from the ink injection port 51, so as to inject the pigment solvents into the pigment solvent storage cotton core in the inner cavity of the first penholder 1 or the second penholder 2. After injecting the ink, the syringe needle can be removed from the elastic sealing part 5. Then, the end of the corresponding first penholder 1 or the second penholder 2 away from the corresponding pen head can be inserted into the connecting tube 3 from the corresponding opening of the connecting tube 3, and the corresponding first penholder 1 or the second penholder 2 can be pushed to slide relative to the inner wall of the connecting tube 3 until the corresponding first stopper ring 14 or the second stopper ring 24 abuts against a corresponding end surface of the connecting tube 3, thereby finishing the replacement of the first penholder 1 or the second penholder 2 exhausted of the pigment solvents.

In this way, instead of replacing a double-head marker pen and discarding an unused pen tip, each of the pen tips of the double-head marker pen is reusable, so that an utilization rate of each of the pen tips of the double-head marker pen is effectively improved, and thus a use cost of the marker pen is effectively reduced. In addition, this contributes to resource saving and environmental protection.

The above are the preferred embodiments of the present application, which are not intended to limit the protection scope of the present application. Therefore, all equivalent changes made according to the structure, shape and principle of the present application should be covered within the protection scope of the present application.

LISTING OF REFERENCE SIGNS

1. first penholder;
11. first pen head;
12. pointed pen tip;
13. first pen cap;
14. first stopper ring;
141. first edge;
15. first cotton core insertion port;
2. second penholder;
21. second pen head;
22. flat pen tip;
23. second pen cap;
24. second stopper ring;
241. second edge;
3. connecting tube;
4. closure;
5. elastic sealing part;
51. ink injection port.

What is claimed is:

1. A double-head marker pen, comprising a first penholder, a second penholder and a connecting tube; a first end of the first penholder is formed with a first pen head, and a first end of the second penholder is formed with a second pen head; and a second end of the first penholder away from the first pen head is detachably connected with a second end of the second penholder away from the second pen head by the connecting tube, wherein the second end of the first penholder away from the first pen head is defined with a first cotton core insertion port in communication with an inner cavity of the first penholder, the second end of the second penholder away from the second pen head is defined with a second cotton core insertion port in communication with an inner cavity of the second penholder, and the first cotton core insertion port and the second cotton core insertion port are detachably provided with a closure, respectively.

2. The double-head marker pen according to claim 1, wherein the second end of the first penholder away from the first pen head and the second end of the second penholder away from the second pen head are inserted into the connecting tube from both ends of the connecting tube, respectively, and are slidably connected with an inner wall of the connecting tube along a length direction of the connecting tube; and the first penholder is in close fit connection with the connecting tube, and the second penholder is in close fit connection with the connecting tube.

3. The double-head marker pen according to claim 1, wherein the first end of the first penholder close to the first pen head is formed with a first stopper ring, and the first end of the second penholder close to the second pen head is formed with a second stopper ring.

4. The double-head marker pen according to claim 3, wherein the first end of the first penholder formed with the first pen head is provided with a first pen cap, and the first end of the second penholder formed with the second pen head is provided with a second pen cap; and the first pen cap abuts against the first stopper ring, and the second pen cap abuts against the second stopper ring.

5. The double-head marker pen according to claim 4, wherein a part of the first stopper ring corresponding to an outer circular surface of the connecting tube protrudes from an outer circular surface of the first pen cap and the outer circular surface of the connecting tube, and forms a first edge; and a part of the second stopper ring corresponding to the outer circular surface of the connecting tube protrudes from an outer circular surface of the second pen cap and the outer circular surface of the connecting tube, and forms a second edge.

6. The double-head marker pen according to claim 1, wherein a cross section of the first penholder along a direction vertical to a length direction of the first penholder, a cross section of the second penholder along a direction vertical to a length direction of the second penholder, and a cross section of the connecting tube along a direction vertical to a length direction of the connecting tube have a water-drop shape.

7. The double-head marker pen according to claim 6, wherein an outer circumferential surface of the first penholder and an outer circumferential surface of the second penholder are composed of a first inclined plane, a second inclined plane and an arc-shaped surface; an angle between the first inclined plane and the second inclined plane is an acute angle, and two sides of the arc-shaped surface are respectively connected to the first inclined plane and the second inclined plane transitively via an arc surface; and a shape of an inner circumferential wall of the connecting tube is matched with a shape of the outer circumferential surface of the first penholder and a shape of the outer circumferential surface of the second penholder.

8. The double-head marker pen according to claim 1, wherein a middle part of each closure is mounted with an elastic sealing part, and an ink injection port is defined in and runs through each elastic sealing part along a length direction of the first penholder or a length direction of the second penholder.

9. The double-head marker pen according to claim 8, wherein each ink injection port in each elastic sealing part is closed by an elastic force of each elastic sealing part during a non-ink injection period, and an inner diameter of each ink injection port is expandable when inserting an external object.

10. The double-head marker pen according to claim 8, wherein the first penholder is in sealing cooperation with the connecting tube, and the second penholder is in sealing cooperation with the connecting tube.

11. The double-head marker pen according to claim 10, wherein an outer circumferential surface of the first penholder and an outer circumferential surface of the second penholder are composed of a first inclined plane, a second inclined plane and an arc-shaped surface; an angle between the first inclined plane and the second inclined plane is an acute angle, and two sides of the arc-shaped surface are respectively connected to the first inclined plane and the second inclined plane transitively via an arc surface; and a shape of an inner circumferential wall of the connecting tube is matched with a shape of the outer circumferential surface of the first penholder and a shape of the outer circumferential surface of the second penholder.

12. A double-head marker pen, comprising a first penholder, a second penholder and a connecting tube; a first end of the first penholder is formed with a first pen head, and a first end of the second penholder is formed with a second pen head; and a second end of the first penholder away from the first pen head is detachably connected with a second end of the second penholder away from the second pen head by the connecting tube, wherein the first end of the first penholder close to the first pen head is formed with a first stopper ring, the first end of the second penholder close to the second pen head is formed with a second stopper ring, the first end of the first penholder formed with the first pen head is provided with a first pen cap, and the first end of the second penholder formed with the second pen head is provided with a second pen cap; and the first pen cap abuts against the first stopper ring, the second pen cap abuts against the second stopper ring, a part of the first stopper ring corresponding to an outer circular surface of the connecting tube protrudes from an outer circular surface of the first pen cap and the outer circular surface of the connecting tube, and forms a first edge; and a part of the second stopper ring corresponding to the outer circular surface of the connecting tube protrudes from an outer circular surface of the second pen cap and the outer circular surface of the connecting tube, and forms a second edge.

13. A double-head marker pen, comprising a first penholder, a second penholder and a connecting tube; a first end of the first penholder is formed with a first pen head, and a first end of the second penholder is formed with a second pen head; and a second end of the first penholder away from the first pen head is detachably connected with a second end of the second penholder away from the second pen head by the connecting tube, wherein a cross section of the first penholder along a direction vertical to a length direction of the first penholder, a cross section of the second penholder along a direction vertical to a length direction of the second penholder, a cross section of the connecting tube along a direction vertical to a length direction of the connecting tube have a water-drop shape, an outer circumferential surface of the first penholder and an outer circumferential surface of the second penholder are composed of a first inclined plane, a second inclined plane and an arc-shaped surface; an angle between the first inclined plane and the second inclined plane is an acute angle, and two sides of the arc-shaped surface are respectively connected to the first inclined plane and the second inclined plane transitively via an arc surface; and a shape of an inner circumferential wall of the connecting tube is matched with a shape of the outer circumferential surface of the first penholder and a shape of the outer circumferential surface of the second penholder.

* * * * *